United States Patent
Zoppi

(10) Patent No.: US 6,203,769 B1
(45) Date of Patent: Mar. 20, 2001

(54) PROCESS FOR THE TREATMENT OF FLUOBORIC ELECTROLYTE

(75) Inventor: Gianni Zoppi, Dino di Sonvico (CH)

(73) Assignee: Ecochem Aktiengesellschaft, Triesen (LI)

( * ) Notice: Subject to any disclaimer, the term of this patent is extended or adjusted under 35 U.S.C. 154(b) by 0 days.

(21) Appl. No.: 09/346,114

(22) Filed: Jul. 1, 1999

(30) Foreign Application Priority Data

Jul. 7, 1998 (CH) .................................................. 1445/98

(51) Int. Cl.$^7$ ........................... C01B 17/96; C01B 35/00; C01F 11/46; C01G 49/00
(52) U.S. Cl. ........................... 423/37; 205/586; 205/600; 423/92; 423/106; 423/146; 423/166; 423/276; 423/544; 423/554; 423/555; 423/558; 423/561.1
(58) Field of Search .................................... 205/586, 599, 205/600, 568, 570; 423/37, 92, 106, 146, 166, 276, 561.1, 554, 555, 558, 544

(56) References Cited

U.S. PATENT DOCUMENTS

| | | | |
|---|---|---|---|
| 5,498,398 | * 3/1996 | Kang et al. | 423/37 |
| 5,783,057 | * 7/1998 | Tomita et al. | 205/586 |
| 5,935,409 | * 8/1999 | King et al. | 205/599 |

* cited by examiner

*Primary Examiner*—Wayne Langel
(74) *Attorney, Agent, or Firm*—Oblon, Spivak, McClelland, Maier & Neustadt, P.C.

(57) ABSTRACT

The invention relates to a method for the treatment of fluoboric electrolyte resulting from the processes of electro-extraction of metals such as copper and lead comprising a leaching stage with fluoboric acid, in order to recycle said fluoboric acid to be recirculated to said leaching stage devoid of impurities of metals such as Me=Fe, Zn, Ca, Mg, Cd, characterized in that it comprises the stages of:

a) treating said fluoboric electrolyte comprising $Cu(BF_4)_2$ or $Pb(BF_4)_2$ with $H_2S$ in order to precipitate CuS or PbS respectively in accordance with the reactions $$Cu(BF_4)_2 + H_2S => CuS + 2HBF_4 \quad (1)$$

$$Pb(BF_4)_2 + H_2S => PbS + 2HBF_4 \quad (2)$$

thus obtaining a solution of $HBF_4$ containing the fluoborates of said metals Me, said solution being separated, b) treating said Me fluoborates with $H_2SO_4$ in accordance with the reaction $$2\,Me(BF_4)_n + n\,H_2SO_4 => Me(SO_4)_n + 2n\,HBF_4 \quad (3)$$

(where Me=Fe, Zn, Ca, Mg, Cd) it being possible for said sulphates $Me(SO_4)_n$ to be removed so as to obtain a solution of $HBF_4$ substantially free from impurities of said metals Me.

7 Claims, 1 Drawing Sheet

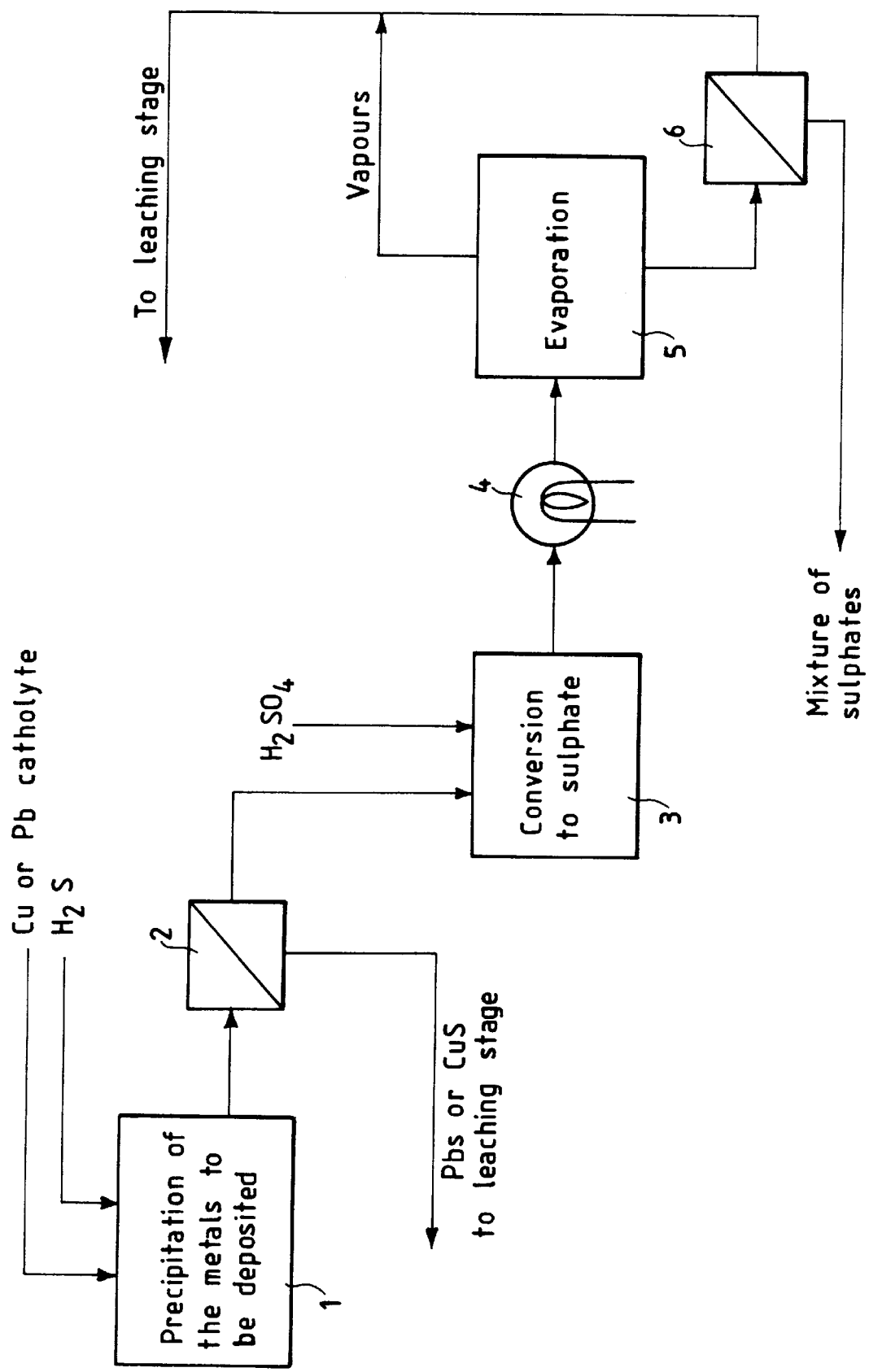

PROCESS FOR THE TREATMENT OF FLUOBORIC ELECTROLYTE

BACKGROUND OF THE INVENTION

1. Field of the Invention

In electrowinning processes, the purity of the electrolyte used depends on the quantity of impurities present in the material from which the metal to be deposited on the cathode and solubilized during the leaching process is obtained.

2. Description of the Background

In processes based on sulphur-containing electrolytes, owing to the low cost of the electrolyte itself, the electrolyte may be discharged in the water treatment plants usually present in the plant, resulting in a significant loss of electrolyte.

Owing to its high cost and the difficulty of processing it in a water treatment plant, the fluoboric electrolyte cannot undergo the same cycle as the sulphur-containing electrolyte.

For this reason, in the technical field in question attempts are being made to find a method which allows the elimination of these impurities, while minimizing at the same time the loss of electrolyte.

The most important fluoboric electrowinning processes are associated with the recovery of Cu and Pb from minerals or from by-products where they are present together with other elements which are partially or totally dissolved during the leaching step. In this connection Swiss Patent Application No. 1886/97 in the name of the same Applicant may be mentioned.

The more noble impurities of the metals to be deposited are usually removed by means of cementation, i.e reduction to the metal by the metal to be deposited in accordance with the reactions:

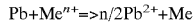
$$Pb + Me^{n+} => n/2 Pb^{2+} + Me$$

(where Me=Ag, Cu, Sb, Bi, etc.)

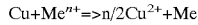
$$Cu + Me^{n+} => n/2 Cu^{2+} + Me$$

(where Me=Ag, Bi, etc.)

The less noble impurities of the metals to be deposited, such as Fe, Zn, Ca, Mg, Cd, etc., are much more difficult to remove and, if they are not removed, tend to accumulate in the solution, reducing the quantity of free acid. This causes two types of problem: a reduction in the dissolving power of the solution during the leaching step and a reduction in the fineness of the crystal grain of the deposited metal. For these reasons it is very important to find a method which allows the removal of these types of impurities, while keeping the acidity in a suitable concentration range, and this is the main object of the present invention.

SUMMARY OF THE INVENTION

Surprisingly it has now been found that this object is achieved according to the present invention by means of a method for the treatment of fluoboric electrolyte resulting from the processes of electro-extraction of metals such as copper and lead comprising a leaching stage with fluoboric acid, in order to recycle said fluoboric acid to be recirculated to said leaching stage devoid of impurities of metals such as Me=Fe, Zn, Ca, Mg, Cd, characterized in that it comprises the stages of:

a) treating said fluoboric electrolyte comprising $Cu(BF_4)_2$ or $Pb(BF_4)_2$ with $H_2S$ in order to precipitate CuS or PbS respectively in accordance with the reactions

$$Cu(BF_4)_2 + H_2S => CuS + 2HBF_4 \quad (1)$$

$$Pb(BF_4)_2 + H_2S => PbS + 2HBF_4 \quad (2)$$

thus obtaining a solution of $HBF_4$ containing the fluoborates of said metals Me, said solution being separated, b) treating said Me fluoborates with $H_2SO_4$ in accordance with the reaction

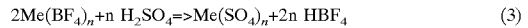
$$2Me(BF_4)_n + n\,H_2SO_4 => Me(SO_4)_n + 2n\,HBF_4 \quad (3)$$

(where Me=Fe, Zn, Ca, Mg, Cd)

it being possible for said sulphates $Me(SO_4)_n$ to be removed so as to obtain a solution of $HBF_4$ substantially free from impurities of said metals Me.

As a result of the high concentration of the fluoborate ion in the process according to the invention it is therefore possible to precipitate the impurities present after providing the necessary sulphate ion.

BRIEF DESCRIPTION OF THE DRAWING

The drawing illustrates a flow diagram of the process of the present invention.

DETAILED DESCRIPTION OF THE PREFERRED EMBODIMENTS

In order to understand more fully characteristic features and advantages of the invention, a working example thereof with reference to the figure of the accompanying drawing is described below. This figure shows a flow diagram of the process according to the invention.

With reference to this figure, in a reactor (1) precipitation of the metal to be deposited is performed in accordance with the following reactions:

$$Cu(BF_4)_2 + H_2S => CuS + 2HBF_4 \quad (1)$$

$$Pb(BF_4)_2 + H_2S => PbS + 2HBF_4 \quad (2)$$

The suspension of the sulphides thus obtained is concentrated in a decanter (2) and transferred as such to the metal leaching stage. The solution resulting from (2) is supplied at (3) where, through the addition of $H_2SO_4$ to the clarified solution, the fluoborates are converted into sulphates in accordance with the reaction:

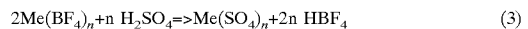
$$2Me(BF_4)_n + n\,H_2SO_4 => Me(SO_4)_n + 2n\,HBF_4 \quad (3)$$

(where Me=Fe, Zn, Ca, Mg, Cd)

By means of an exchanger (4) the solution thus obtained is heated until a substantial proportion of the water contained therein has evaporated, producing a dispersion (5) as a result of the precipitation of part of the sulphates previously converted.

Centrifuging (6) of the dispersion (5) produces a solution which, together with the vapours condensed in the concentration unit, is supplied again to the fluoboric leaching reactor. In this way the concentration of the impurities may be kept at a constantly low level.

A working example of the process according to the invention, which is not to be regarded as limiting, is now described.

EXAMPLE 1 l of fluoboric electrolyte containing Cu and other impurities is treated with $H_2S$ until near complete precipitation of the Cu. After filtration and washing of the CuS cake, the wash water is added to the fluoboric solution together with 60 g of 96% strength $H_2SO_4$. Heating is performed to achieve concentration and the behaviour of the solution, described in the following table, is observed.

| Time | Volume (l) | Remarks |
|---|---|---|
| 11.00 | 1.2 | Very slight cloudiness |
| 11.30 | 1.1 | Presence of white salt |
| 12.30 | 0.9 | Presence of white/yellowish salt |
| 13.30 | 0.7 | Presence of yellowish salt |
| 14.30 | 0.6 | Stop |

Cloth filtration is performed. The following are recovered:

118 g of yellow microcrystalline salt as such 0.40 l of filtrate

The analyses carried out during this test gave the following results:

| Composition of | Quantity (l or g) | Ni | Mg | Zn | Cd | Mn | Fe | $SO_4$ | $HBF_4$ |
|---|---|---|---|---|---|---|---|---|---|
| Initial solution (g/l) | 1.00 l | 5.87 | 2.42 | 6.54 | 11.20 | 5.49 | 5.58 | 57.6 | 100.0 |
| Final solution (g/l) | 0.49 l | 8.13 | 2.90 | 5.77 | 5.4 | 1.11 | 0.61 | 21.2 | 199.8 |
| Precipitated salt (%) | 118 g | 1.08 | 0.41 | 2.81 | 4.84 | 3.90 | 4.10 | 40.0 | n.a. |

The results of this test are shown in the following table:

| Percentage precipitation calculated from | NI | Mg | Zn | Cd | Mn | Fe | $SO_4$ | $HBF_4$ |
|---|---|---|---|---|---|---|---|---|
| Analysis of the solutions (%) | 32.1 | 41.5 | 56.8 | 76.2 | 90.1 | 94.6 | 82.0 | negl. |
| Analysis of the precipitated salt (%) | 21.8 | 19.9 | 50.7 | 51.0 | 84.1 | 86.7 | 81.9 | negl. |

From an analysis of the data contained in the table it can be seen that the precipitation of the elements in the solution, despite the low concentrations, is considerable.

At these concentrations both the fluoborate solutions and the sulphate solutions of the elements in question, considered individually, should be stable because they are very far from saturation.

It is also noted that no fluoborate is present in the final salt.

The test therefore confirms the very limited solubility of the sulphates in the presence of fluoborate ions.

What is claimed is:

1. A method for the treatment of fluoboric electrolyte sludges resulting from electro-extraction of metals, comprising a leaching stage with fluoboric acid, to remove metal (Me) impurities from said fluoboric acid, in order to recycle said fluoboric acid to said leaching stage substantially free of said Me impurities, which method comprises:

a) treating said fluoboric electrolyte sludges, comprising $Cu(BF_4)_2$ or $Pb(BF_4)_2$ with $H_2S$, thereby precipitating CuS or PbS, respectively, in accordance with the reactions:

$$Cu(BF_4)_2 + H_2S => CuS + 2HBF_4 \quad (1)$$

$$Pb(BF_4)_2 + H_2S => PbS + 2HBF_4 \quad (2)$$

thus obtaining a solution of $HBF_4$ containing the Me fluoborates, said solution being separated; and b) treating said solution of $HBF_4$ containing the Me fluoborates with $H_2SO_4$ to produce Me sulfates in accordance with the reaction:

$$2Me(BF_4)_n + n\, H_2SO_4 => Me(SO_4)_n + 2n\, HBF_4 \quad (3)$$

wherein Me is selected from the group consisting of Fe, Zn, Ca, Mg, and Cd; and whereby said Me sulfates are removed so as to obtain a solution of $HBF_4$ substantially free from impurities of said metals Me.

2. The met hod of claim 1, wherein said removal of Me sulfates from the solution of $HBF_4$ is performed by evaporating the liquid produced in said stage b), thus producing a dispersion by means of precipitation of at least a part of said Me sulfates, said dispersion being separated from said solution of $HBF_4$.

3. The method of claim 1, wherein in step a) the separation from said solution of $HBF_4$ is performed by allowing the suspension of the said precipitated sulfides to settle, said suspension thus separated being recirculated to said leaching stage.

4. The method of claim 1, which further comprises, after step a), but before step b), concentrating the sulfides produced in step a) in a decanter.

5. The method of claim 1, which further comprises after step b), passing the solution containing said Me sulfates to an exchanger, where in s aid solution is heated, thereby removing water from said solution to produce a dispersion.

6. The method of claim 5, which further comprises passing the dispersion to a centrifuge, wherein a solution obtained therefrom is passed to the fluoboric leaching step.

7. The method of claim 1, wherein said $H_2SO_4$ of step b) has a strength of 96%.

* * * * *